United States Patent
Bae et al.

(10) Patent No.: US 12,113,239 B2
(45) Date of Patent: Oct. 8, 2024

(54) SEPARATOR, METHOD OF MANUFACTURING SEPARATOR, AND ELECTROCHEMICAL DEVICE INCLUDING SEPARATOR

(71) Applicants: SK INNOVATION CO., LTD., Seoul (KR); SK IE TECHNOLOGY CO., LTD., Seoul (KR)

(72) Inventors: Heung Taek Bae, Daejeon (KR); Chang Hee Lee, Daejeon (KR); Won Sub Kwack, Daejeon (KR); Tae Wook Kwon, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 0 days.

(21) Appl. No.: 18/331,554

(22) Filed: Jun. 8, 2023

(65) Prior Publication Data
US 2023/0402716 A1 Dec. 14, 2023

(30) Foreign Application Priority Data
Jun. 9, 2022 (KR) .................. 10-2022-0070367

(51) Int. Cl.
*H01M 50/446* (2021.01)
*H01M 10/052* (2010.01)
*H01M 50/403* (2021.01)
*H01M 50/449* (2021.01)

(52) U.S. Cl.
CPC ....... *H01M 50/446* (2021.01); *H01M 10/052* (2013.01); *H01M 50/403* (2021.01); *H01M 50/449* (2021.01)

(58) Field of Classification Search
CPC .. H01M 50/40; H01M 50/417; H01M 50/403; H01M 50/446; H01M 10/0525
See application file for complete search history.

(56) References Cited

U.S. PATENT DOCUMENTS

| | | | |
|---|---|---|---|
| 3,925,332 A * | 12/1975 | Naito | H01M 8/1088 525/344 |
| 9,166,250 B2 | 10/2015 | Katayama et al. | |
| 2005/0221165 A1* | 10/2005 | Hennige | H01M 50/451 429/251 |
| 2015/0017512 A1 | 1/2015 | Terwonne et al. | |
| 2015/0056492 A1* | 2/2015 | Huang | H01M 50/457 521/62 |
| 2015/0325831 A1* | 11/2015 | Dennes | H01M 50/489 429/144 |
| 2017/0373284 A1* | 12/2017 | Durstock | H01M 4/625 |
| 2019/0198837 A1* | 6/2019 | Yushin | H01M 50/446 |

FOREIGN PATENT DOCUMENTS

| | | |
|---|---|---|
| EP | 4246698 A1 | 9/2023 |
| KR | 20150084116 A | 7/2015 |
| KR | 20160073126 A | 6/2016 |
| KR | 101943502 B1 | 1/2019 |
| KR | 102238664 B1 | 4/2021 |

OTHER PUBLICATIONS

Extended European Search Report for the European Patent Application No. 23178484.4 issued by the European Patent Office on Oct. 18, 2023.

* cited by examiner

*Primary Examiner* — Kenneth J Douyette
(74) *Attorney, Agent, or Firm* — IP & T GROUP LLP

(57) ABSTRACT

Provided are a separator, a method of manufacturing the separator, and an electrochemical device including the separator. According to an embodiment of the present disclosure, a separator including a porous substrate and an inorganic particle layer provided on at least one surface of the porous substrate, the inorganic particle layer including inorganic particles, a hydrolytic condensate binder of a polar silane compound, and an aqueous polymer binder, wherein an amount of change in peel strength, $\Delta P$ is 1.1 or more may be provided.

10 Claims, No Drawings

SEPARATOR, METHOD OF MANUFACTURING SEPARATOR, AND ELECTROCHEMICAL DEVICE INCLUDING SEPARATOR

CROSS-REFERENCE TO RELATED APPLICATIONS

This application claims priority under 35 U.S.C. § 119 to Korean Patent Application No. 10-2022-0070367, filed on Jun. 9, 2022, in the Korean Intellectual Property Office, the disclosure of which is incorporated herein by reference in its entirety.

TECHNICAL FIELD

The present disclosure relates to a separator, a method of manufacturing the separator, and an electrochemical device including the separator, and more particularly, to a separator having significantly improved dimensional stability at a high temperature, a method of manufacturing the separator, and an electrochemical device including the separator.

BACKGROUND

A separator which is applied to various electrochemical devices may shrink at a high temperature to cause an internal short circuit, and since the internal short circuit may cause a fire, dimensional stability at a high temperature should be necessarily improved for a user's safety. In order to secure the dimensional stability at a high temperature of the separator, an organic-inorganic composite porous separator in a form in which an inorganic particle layer is stacked on the surface of a porous substrate has been developed, and a technology of using a silane compound having excellent thermal stability as the binder of the inorganic particle layer has been developed.

However, the silane compound improves thermal stability such as a heat shrinkage rate to some extent, but bonding characteristics and thermal stability are still lacking. In addition, when the silane compound is used alone, binding characteristics are insufficient, so that inorganic particles may be released from the inorganic particle layer during cell assembly, and the released inorganic particles may cause defects. Due to the phenomena as such, there is a possibility of not guaranteeing dimensional stability at a high temperature required for user's safety when a cell is operated later. Accordingly, a new separator for further improving the dimensional stability of the separator at a high temperature is desperately needed.

RELATED ART DOCUMENTS

Patent Documents

Patent Document 1: Korean Patent Laid-Open Publication No. 10-2014-0011136 published on Jan. 28, 2014.

SUMMARY

An embodiment of the present disclosure is directed to providing a separator which provides high battery safety at a high temperature by further improving dimensional stability at a high temperature and also improving adhesion/cohesion of an inorganic particle layer to prevent release of inorganic particles during cell assembly and suppress defects due to released inorganic particles, a method of manufacturing the separator, and an electrochemical device including the separator.

In one general aspect, a separator includes: a porous substrate and an inorganic particle layer provided on at least one surface of the porous substrate, wherein an amount of change in peel strength, $\Delta P$, represented by the following Equation (1) is 1.1 or more:

$$\Delta P = P_1/P_2 \tag{1}$$

wherein
$P_1$ is peel strength of the separator,
$P_2$ is peel strength of a separator including a porous substrate and an inorganic particle layer which is provided on at least one surface of the porous substrate and includes inorganic particles and a hydrolytic condensate binder of a polar silane compound, and
the peel strength is measured by adhering a double-sided tape having a width of 15 mm and a length of 60 mm from one end in a length direction on a copper plate having a thickness of 200 μm, a width of 15 mm, and a length of 100 mm, adhering the separator thereon by stacking and pressing so that the tape faces the inorganic particle layer of the separator, and using a universal testing machine (UTM) equipment to perform a 180° peel test under conditions of a speed of 300 ram/min and a displacement of 100 mm.

As an example, the inorganic particle layer may include boehmite particles and a hydrolytic condensate of (3-aminopropyl) triethoxysilane.

In the following description, two types of specimens with a width of 5 mm and a length of 10 mm were prepared, with one specimen having a length direction in the machine direction and the other specimen having a length direction in a transverse direction. In this embodiment, when specimens each having a thickness of 5 to 50 μm, a width of 5 mm, and a length of 10 mm in each of MD and TD serving as length directions were prepared as noted above, and each specimen is mounted on a chamber of a thermomechanical analyzer (TMA) (model: SDTA840 (Mettler Toledo)) by hooking both ends of each specimen to a metal jig and pulled downward with a force of 0.008 N while heating at 5° C. per minute, the two types of specimens were not broken until after a temperature of 180° C. was reached In addition, in an embodiment, a heat shrinkage rate in MD and TD measured after the separator is allowed to stand at 130° C. for 60 minutes may be 3% or less.

In addition, in an embodiment, after 10 μl of an electrolyte solution in which 1 M lithium hexafluorophosphate (LiPF$_6$) is dissolved in a solution including ethylene carbonate (EC), ethyl methyl carbonate (EMC), and dimethyl carbonate (DMC) at a volume ratio of is dropped on the separator as one drop from a height of 50 mm with a micropipette and then the separator is allowed to stand for 1 minute, an electrolyte solution spread mark may have a long diameter of 25 mm or more.

In addition, in an embodiment, the separator may have an amount of change in air permeability, $\Delta G$, represented by the following Equation (2) of 50 sec/100 cc or less:

$$\Delta G = G_1 - G_2 \tag{2}$$

wherein
$G_1$ is a Gurley permeability of the separator,
$G_2$ is a Gurley permeability of the porous substrate, and
the Gurley permeability is measured in accordance with ASTM D 726.

In addition, in an embodiment, the inorganic particle layer may include inorganic particles, a hydrolytic condensate binder of a polar silane compound, and an aqueous polymer binder.

In addition, in an embodiment, the aqueous polymer binder may include one or two or more of polyvinylpyrrolidone (PVP), polyethyleneimine (PEI), poly(N-vinylacetamide) (PNVA), poly(meth)acrylamide (PAM), and polyamide (PA).

In addition, in an embodiment, the hydrolytic condensate binder of a polar silane compound may be a hydrolytic condensate which is hydrolyzed and condensation-suppressed in a weakly acidic atmosphere.

In addition, in an embodiment, the polar silane compound may be a compound represented by the following Chemical Formula 1:

$$A_a Si(OR)_b \qquad \text{Chemical Formula 1}$$

wherein A is independently a polar functional group or a C1-C10 alkyl group having a polar functional group, R is independently hydrogen or a C1-C5 alkyl group, a is 1 to 2, b is 2 to 3, and a+b is 4.

In addition, in an embodiment, the polar functional group may include any one or two or more of an amino group, an epoxy group, a carboxyl group, a hydroxyl group, an amide group, a thiol group, a ketone group, an ester group, and an aldehyde group.

In addition, in an embodiment, a weight ratio $B_2/B_1$ of a weight $B_2$ of the aqueous polymer binder to a weight B1 of the hydrolytic condensate binder of a polar functional group may be 0.01 to 1.0.

In addition, in an embodiment, the porous substrate may include a polar functional group on the surface.

In another general aspect, a method of manufacturing a separator includes: (a) stirring a polar silane compound represented by the following Chemical Formula 1, inorganic particles, an acid component, an aqueous polymer binder, and water to prepare a coating slurry; and (b) applying the coating slurry prepared on at least one surface of a porous substrate and drying the slurry to prepare an inorganic particle layer:

$$A_a Si(OR)_b \qquad \text{Chemical Formula 1}$$

wherein A is independently a polar functional group or a C1-C10 alkyl group having a polar functional group, R is independently hydrogen or a C1-C5 alkyl group, a is 1 to 2, b is 2 to 3, and a+b is 4.

In addition, in an embodiment, the coating slurry of (a) may be prepared by including the following processes (a1) to (a3):

(a1) preparing an acid aqueous solution including a polar silane compound represented by Chemical Formula 1 and an acid component;

(a2) stirring inorganic particles, an acid component, and water to prepare an inorganic slurry; and (a3) stirring the inorganic slurry prepared, an acid aqueous solution, and an aqueous polymer binder to prepare a coating slurry.

In addition, in an embodiment, the process of preparing a coating slurry (a3) may be performed under a weakly acidic atmosphere of more than pH 4 and pH 6 or less.

In addition, in an embodiment, an absolute value of a difference in pH between the inorganic slurry prepared in the process (a2) and the acid aqueous solution prepared in the process (a1) may be 1 or less.

In addition, in an embodiment, in the process (a1), the polar silane compound may be included at 10 wt % or less with respect to the total weight of the acid aqueous solution.

In addition, in an embodiment, in the process (a), the polar silane compound may be included at 5 wt % or less with respect to the total weight of the coating slurry.

In addition, in an embodiment, the polar functional group may include any one or two or more of an amino group, an epoxy group, a carboxyl group, a hydroxyl group, an amide group, a thiol group, a ketone group, an ester group, and an aldehyde group.

In addition, in an embodiment, the process of preparing a coating slurry (a) may be performed under a weakly acidic atmosphere of more than pH 4 and pH 6 or less.

In addition, in an embodiment, the acid component may be carbon dioxide; or an organic acid including any one or two selected from acetic acid and lactic acid.

In addition, a method of manufacturing a separator according to an embodiment may further include (c) aging the porous substrate having the inorganic particle layer provided thereon, after the process (b).

In addition, in an embodiment, the porous substrate may be prepared by a hydrophilic surface treatment.

In addition, in an embodiment, the hydrophilic surface treatment may be performed by including one or more of a corona discharge treatment and a plasma discharge treatment.

In still another general aspect, an electrochemical device includes: the separator of one of the embodiments described above.

Other features and aspects will be apparent from the following detailed description, the drawings, and the claims.

DETAILED DESCRIPTION OF EMBODIMENTS

Hereinafter, the present disclosure will be described in more detail with reference to specific embodiments including the accompanying drawings. However, the following specific examples are only a reference, and the present disclosure is not limited thereto and may be implemented in various forms.

In addition, unless otherwise defined, all technical terms and scientific terms have the same meanings as those commonly understood by one of those skilled in the art to which the present disclosure pertains. The terms used herein are only for effectively describing a certain specific example, and are not intended to limit the present disclosure.

In addition, the singular form used in the specification and claims appended thereto may be intended to include a plural form also, unless otherwise indicated in the context.

In addition, unless particularly described to the contrary, "comprising" any elements will be understood to imply further inclusion of other elements rather than the exclusion of any other elements.

In the present specification, "D50" refers to a particle diameter of inorganic particles which corresponds to 50% of a volume-based integration fraction. "D80" refers to a particle diameter of inorganic particles which corresponds to 80% of a volume-based integration fraction. "D20" refers to a particle diameter of inorganic particles which corresponds to 20% of a volume-based integration fraction. D50, D80, and D20 may be derived from particle size distribution results obtained by collecting a sample of the inorganic particles to be measured in accordance with the standard of KS A ISO 13320-1 and performing analysis using a Multisizer 4e Coulter counter available from Beckman Coulter Inc.

In addition, an "aqueous" material means that when 0.5 g of the material is dissolved in 100 g of water at 25° C., an insoluble content is less than 0.5 wt %. However, a "non-aqueous" material means that when 0.5 g of the material is dissolved in 100 g of water at 25° C., an insoluble content is 90 wt % or more.

According to an embodiment of the present disclosure, a secondary battery separator having an inorganic particle layer in which inorganic particles are connected to each other to form pores, provided on at least one surface of a porous substrate is provided, and a hydrolytic condensate binder of a polar silane compound which is prepared under specific conditions of hydrolyzing and simultaneously condensation-suppressing a silanol or alkoxysilane-based compound and an aqueous polymer binder may be used together as a binder of the inorganic particle layer to significantly improve the thermal stability of the separator. In addition, the adhesion/cohesion of the inorganic particle layer is improved to prevent release of inorganic particles during cell assembly and suppress defects due to the released inorganic particles, thereby significantly improving battery stability at a high temperature. It is considered that the effect may be achieved by applying the condensation-suppressed hydrolytic condensate of a silane compound and an aqueous polymer binder together as the binder of the inorganic particle layer to more strongly connect and fix inorganic particles in the inorganic particle layer by a hydrogen bond or other polar attraction. The separator according to an embodiment of the present disclosure has further improved dimensional stability at a high temperature and improved adhesion/cohesion of an inorganic particle layer to prevent release of inorganic particles during cell assembly and suppress defects due to the released inorganic particles, thereby providing high battery safety at a high temperature.

According to an embodiment, the separator may secure significantly high thermal stability and simultaneously improve peel strength. The separator of an embodiment may have an amount of change in peel strength, $\Delta P$, represented by the following Equation (1) of 1.1 or more, 1.2 or more, 1.3 or more, or 1.5 or more:

$$\Delta P = P_1/P_2 \qquad (1)$$

wherein $P_1$ is peel strength of the separator, $P_2$ is peel strength of a separator including a porous substrate and an inorganic particle layer which is provided on at least one surface of the porous substrate and includes boehmite particles and a hydrolytic condensate of (3-aminopropyl) triethoxysilane (APTES), and the peel strength is measured by adhering a 3M double-sided tape (Model: 665) having a width of 15 mm and a length of 60 mm from one end in a length direction on a copper plate having a thickness of 200 μm, a width of 15 mm, and a length of 100 mm, adhering the separator thereon by stacking and pressing so that the tape faces the inorganic particle layer of the separator, and using UTM equipment available from Instron to perform a 180° peel test under conditions of a speed of 300 ram/min and a displacement of 100 mm.

In an embodiment, the separator may have excellent thermal stability so that when the separator is manufactured into two specimens each of which has a thickness of 5 to 50 μm, a width of 5 mm, and a length of 10 mm in which a length direction is MD and TD, and the specimen is placed in a chamber of TMA (thermomechanical analyzer, model: SDTA840 (Mettler Toledo)) by hooking both ends of the specimen to a metal jig and pulled downward with a force of 0.008 N while heating at 5° C. per minute, the specimens are broken at a temperature of 180° C. or higher, 190° C. or higher, 200° C. or higher, or 210° C. or higher.

In an embodiment, the separator may have a heat shrinkage rate in MD and TD measured after the separator is allowed to stand at 130° C. for 60 minutes of 3% or less or 2.5% or less.

According to an embodiment of the present disclosure, the hydrolytic condensate binder of a polar silane compound and an aqueous polymer binder may be used together to significantly improve electrolyte impregnability. In an embodiment, after 10 μl of an electrolyte solution in which 1 M lithium hexafluorophosphate (LiPF$_6$) is dissolved in a solution including ethylene carbonate (EC), ethyl methyl carbonate (EMC), and dimethyl carbonate (DMC) at a volume ratio of 30:50:20 is dropped on the separator as one drop from a height of 50 mm with a micropipette and then the separator is allowed to stand for 1 minute, an electrolyte solution spread mark may have a long diameter of 25 mm or more.

In addition, the separator according to an embodiment may have an improved air permeability so that an amount of change in air permeability, $\Delta G$, represented by the following Equation (2) of 50 sec/100 cc or less, as compared with a porous substrate having no inorganic particle layer:

$$\Delta G = G_1 - G_2 \qquad (2)$$

wherein $G_1$ is Gurley permeability of the separator, $G_2$ is Gurley permeability of the porous substrate, and the Gurley permeability is measured in accordance with ASTM D 726 and derived by recording a time it takes for 100 cc of air to pass through an area of 1 in$^2$ in seconds. Though the separator according to an embodiment has an inorganic particle layer provided on at least one surface of the porous substrate, it may have an improved air permeability so that an amount of change in air permeability is 50 sec/100 cc or less as compared with a porous substrate having no inorganic particle layer.

The configuration of the separator is not particularly limited on the premise of achieving the physical properties described above. However, according to an embodiment as a means of imparting the physical properties, a separator including a porous substrate and an inorganic particle layer provided on at least one surface of the porous substrate in which the inorganic particle layer includes inorganic particles, a hydrolytic condensate binder of a polar silane compound, and an aqueous polymer binder may be provided.

Hereinafter, each component of the separator according to embodiments of the present disclosure will be described.

According to an embodiment, the porous substrate may use polyolefin such as polyethylene and polypropylene, and may be a film or sheet composed of any one or two or more resins selected from the group consisting thereof.

The polyolefin-based porous substrate is usually manufactured in a film form and is not limited as long as it is usually used as a separator of an electrochemical device, and an example thereof includes polyethylene, polypropylene, copolymers thereof, and the like, but is not necessarily limited thereto.

The thickness of the porous substrate is not particularly limited, but for example, may be 1 μm or more, 3 μm or more, 5 μm or more and 100 μm or less, 50 μm or less, μm or less, 20 μm or less, or between the numerical values. The thickness of the porous substrate may be, as a non-limiting example, 1 to 100 μm, preferably 5 to 50 μm, and more preferably 5 to 30 μm. The porous substrate may be, according to an example, a porous polymer substrate manufactured by stretching.

In an embodiment, the porous substrate may include a polar functional group on the surface. A non-limiting example of the polar functional group may include a carboxyl group, an aldehyde group, a hydroxyl group, and the like, but is not particularly limited. The polar functional group may be, according to an example, introduced by a hydrophilic surface treatment, and the hydrophilic surface treatment may be performed by including, according to an example, one or more of a corona discharge treatment and a plasma discharge treatment. A hydrogen bond, a chemical bond, or polar attraction may act between the polar functional group provided on the surface of the porous substrate and the hydrolytic condensate binder of the polar silane compound described later or the aqueous polymer binder, thereby further improving adhesive strength between the porous substrate and the inorganic particle layer and further lowering a heat shrinkage rate at a high temperature to further improve thermal stability.

In an embodiment, the inorganic particle layer may be a porous inorganic particle layer in which inorganic particles are connected and fixed by the hydrolytic condensate binder of a silane compound and the hydrolytic condensate binder of a polar silane compound to form pores. In an embodiment, the inorganic particle layer is provided on at least one surface of the porous substrate, and may occupy an area fraction of 60% or more, 70% or more, 80% or more, or 90% or more based on an overall surface of the porous substrate.

In an embodiment, the inorganic particle layer may be coated on one surface, or both surfaces of the porous substrate, and when both surfaces of the porous substrate are coated with the inorganic particle layer, the thicknesses of the inorganic particle layers coated on one surface and the other surface may be the same as or different from each other. Without particular limitation, in an embodiment, the thickness of the inorganic particle layer coated on one surface may be more than 0 μm, 0.3 μm or more, 0.5 μm or more and 3 μm or less, 2.5 μm or less, 2 μm or less, 1.5 μm or less, 1 μm or less, or between the numerical values. In a specific embodiment, the thickness of the inorganic particle layer may be more than 0 μm and 2.5 μm or less, more than 0 μm and 2 μm or less, more than 0 μm and 1.5 μm or less, and more than 0 μm and 1 μm or less.

In an embodiment, the inorganic particles are not limited as long as they are inorganic particles used in the art. A non-limiting example of the inorganic particles may include one or two or more of metal hydroxides, metal oxides, metal nitrides, and metal carbides, or one or two or more of $SiO_2$, SiC, MgO, $Y_2O_3$, $Al_2O_3$, $CeO_2$, CaO, ZnO, $SrTiO_3$, $ZrO_2$, $TiO_2$, and AlO(OH). For example, the inorganic particles may be metal hydroxide particles such as boehmite.

Though the metal hydroxide is not particularly limited, a non-limiting example thereof may include one or two or more of boehmite, aluminum hydroxide, and magnesium hydroxide. In an embodiment, when the boehmite is used, for example, a specific surface area (BET) may be 10 m²/g or more or 15 m²/g or more, but the present disclosure is not limited thereto.

In an embodiment, the inorganic particles may be boehmite, in which the specific surface area (BET) of boehmite may be 10 m²/g or more, specifically 15 m²/g or more.

An average particle diameter (D50) of the inorganic particles may be 0.01 μm or more, 0.05 μm or more, 0.1 μm or more and 5 μm or less, 1 μm or less, 0.5 μm or less, or between the numerical values. The average particle diameter (D50) of the inorganic particles may be, as a non-limiting example, 0.01 to 5 μm, 0.01 to 1 μm or less, and 0.01 to 0.5 μm.

Next, an embodiment of a binder in which an inorganic particle layer having pores formed by connecting the inorganic particles is formed will be described. According to an embodiment of the present disclosure, as the binder, a hydrolytic condensate binder of a polar silane compound and an aqueous polymer binder are used together.

An embodiment of the hydrolytic condensate binder of a polar silane compound may be a low-molecular weight condensate having a very suppressed molecular weight in which the polar silane compound represented by the following Chemical Formula 1 is condensed and hydrolyzed in specific conditions:

$A_aSi(OR)_b$  Chemical Formula 1 wherein A is independently a polar functional group or a C1-C10 alkyl group having a polar functional group, R is independently hydrogen or a C1-C5 alkyl group, a is 1 to 2, b is 2 to 3, and a+b is 4. In an embodiment, a low-molecular weight condensate which is condensed using the polar silane compound of Chemical Formula 1 wherein b is 3 may be used.

In an embodiment, the polar functional group may include any one or two or more of an amino group, an epoxy group, a carboxyl group, a hydroxyl group, an amide group, a thiol group, a ketone group, an ester group, and an aldehyde group, or a reactive group which reacts with them. According to an embodiment, the polar functional group may be an amino group.

A non-limiting example of the polar silane compound satisfying Chemical Formula 1 may be any one or a mixture of two or more selected from (3-aminopropyl)triethoxysilane, (3-aminopropyl)trimethoxysilane, and (3-glycidyloxypropyl)trimethoxysilane, and the like, but is not particularly limited thereto.

Meanwhile, when a hydrolytic condensate of a non-polar silane compound is used as a binder rather than the hydrolytic condensate of a polar silane compound as in the embodiment described above, the inorganic particle layer may not be formed well, for example, many spot defects may occur on the surface due to dewetting of the inorganic particle layer, and adhesive strength and a heat shrinkage rate at a high temperature to be desired may not be achieved. In addition, in the above case, an amount of change in air permeability is increased or wettability is deteriorated, so that the electrochemical properties of the separator may be deteriorated.

In an embodiment, since the hydrolytic condensate of a polar silane compound is prepared under the conditions of hydrolyzing and simultaneously condensation-suppressing a polar silane compound, it has a low molecular weight. In an embodiment, the hydrolytic condensate of a polar silane compound may be a hydrolytic condensate which is hydrolyzed and condensation-suppressed in a weakly acidic atmosphere, and may be prepared with a very low molecular weight by suppressing a condensation reaction in a weakly acidic atmosphere. In an embodiment, the hydrolytic condensate of a polar silane compound may be a low molecular weight hydrolytic condensate having a number average molecular weight of, for example, 4000 g/mol or less, 2000 g/mol or less, or 1000 g/mol or less.

Meanwhile, usually, when the polar silane compound of Chemical Formula 1 is condensed by a strong acid such as an inorganic acid, a polysiloxane condensate having a number average molecular weight of thousands of more than 4000 g/mol is produced, but the condensation-suppressed hydrolytic condensate of the polar silane compound of an embodiment of the present disclosure has a hydrolysate of itself, an unreacted material in a monomer form, and a dimer hydrolytic condensate as main components, and is different in that it is a hydrolytic condensate including a trace amount of a trimer hydrolytic condensate or a tetramer hydrolytic condensate.

That is, in an embodiment, the hydrolytic condensate of a polar silane compound may include any one or two or more selected from hydrolysates, monomers, the hydrolyzed and condensed multimers such as dimers, trimers, tetramers, and pentamers of the polar silane compound.

The hydrolytic condensate of the low-molecular weight polar silane compound as the above may be confirmed from a detection peak detected in positive ESI-MS analysis, using positive electrospray ionization Fourier-transform ion cyclotron resonance Mass Spectrometry analysis (posESI FT-ICRMS) (manufacturer: Bruker, model name: Solarix 2XR). That is, as a result of the positive ESI-MS (electrospray ionization-mass spectrometry) analysis, a silanol as a hydrolysate and a dimer peak as a condensate are mainly observed, a trace amount of trimer and tetramer peaks are observed, and the peaks of tetramer or higher are hardly detected within 1 or 2 days during which a slurry is usually prepared. However, when hydrolysis-condensation is performed for 24 hours using hydrochloric acid which is an inorganic acid, though not attached separately, high molecular weight peaks are observed in a complicated manner. From the results, it may be confirmed that different forms of materials are obtained from the hydrolytic condensate of a polar silane compound prepared in a weakly acidic atmosphere and the hydrolytic condensate prepared with an inorganic acid and the like.

The hydrolytic condensate of a polar silane compound according to an embodiment is prepared to have a relatively low molecular weight by condensing a polar silane compound including a polar functional group under the conditions in which a condensation reaction is more suppressed than a hydrolysis reaction, and may secure a more fraction of the polar group at the same weight than that of a polysiloxane condensate which is usually condensed by an inorganic acid and the like and prepared to have a high molecular weight. Surprisingly, the hydrolytic condensate of a polar silane compound has a further improved adhesive strength to connect inorganic particles to each other and may impart significant heat resistance.

In an embodiment, the condensation-suppressed hydrolytic condensate of a polar silane compound may be obtained under a weakly acidic atmosphere of more than pH 4 and pH 6 or less, and according to a non-limiting example, any one or two or more of, in particular, carbon dioxide, acetic acid, and lactic acid may be added to an aqueous solution to prepare a weakly acidic atmosphere in the above pH range, and the addition method may be mixing the acid solution in a liquid phase or blowing or bubbling acid gas.

In addition, in a preferred embodiment, when a polar functional group is introduced to the surface of the porous substrate, the polar functional group provided on the surface of the porous substrate may be hydrogen bonded or chemically bonded to the polar functional group of the hydrolytic condensate binder of a polar silane compound to further improve adhesive strength between the porous substrate and the inorganic particle layer, and a heat shrinkage rate at a high temperature may be further lowered to improve dimensional stability.

In an embodiment, the aqueous polymer binder serves to further increase adhesive strength between inorganic particles in the inorganic particle layer or adhesive strength between the porous substrate and the inorganic particle layer by a hydrogen bond or other polar attractions with the hydrolytic condensate binder of the polar silane compound. Thus, the inorganic particles may be prevented from being released from the inorganic particle layer. In addition, in an embodiment, the aqueous polymer binder may function as a viscosity modifier of a coating slurry for forming the inorganic particle layer to improve coatability.

Meanwhile, when a nonaqueous polymer binder is used rather than the aqueous polymer binder, slurry agglomeration occurs so that it is difficult to proceed with slurry coating, and thus, the inorganic particle layer may not be formed well, and adhesive strength and a heat shrinkage rate at a high temperature to be desired may not be achieved. In addition, in the above case, an amount of change in air permeability is increased or wettability is deteriorated, so that the electrochemical properties of the separator may be deteriorated.

In an embodiment, the aqueous polymer binder is not particularly limited as long as the physical properties are provided, and all aqueous polymer binders known in the art may be used, but in an embodiment, the aqueous polymer binder may contain nitrogen in terms of further imparting adhesive strength of the inorganic particle layer. As a non-limiting example, the aqueous polymer binder may include one or two or more of polyvinylpyrrolidone (PVP), polyethyleneimine (PEI), poly(N-vinylacetamide) (PNVA), poly(meth)acrylamide (PAM), and polyamide (PA). In an embodiment, in order to further improve adhesive strength, the aqueous polymer binder may include polyvinylpyrrolidone (PVP).

According to an embodiment, as a means for lowering a heat shrinkage rate at a high temperature to improve thermal stability and simultaneously further improving adhesion/cohesion of the inorganic particle layer, when a weight ratio $B_2/B_1$ of a weight $B_2$ of the aqueous polymer binder to a weight $B_1$ of the hydrolytic condensate binder of a polar silane compound is excessively high, the heat shrinkage rate at a high temperature may not be sufficiently lowered, but when it is excessively low, peel strength to be desired may not be achieved. In an embodiment, $B_2/B_1$ may be 0.01 or more, 0.03 or more, 0.05 or more, 0.1 or more and 1.0 or less, 0.8 or less, 0.7 or less, 0.6 or less, or between the numerical values. In an embodiment, $B_2/B_1$ may be 0.01 to 1.0 or 0.05 to 0.8.

Next, an embodiment of the method of manufacturing a separator will be described.

As an embodiment, a method of manufacturing a separator including: (a) stirring a polar silane compound represented by the following Chemical Formula 1, inorganic particles, an acid component, an aqueous polymer binder, and water to prepare a coating slurry; and (b) applying the coating slurry prepared on at least one surface of a porous substrate and drying the slurry to prepare an inorganic particle layer may be provided:

$A_aSi(OR)_b$ <span style="float:right">Chemical Formula 1</span> wherein A is independently a polar functional group or a C1-C10 alkyl group having a polar functional group, R is independently hydrogen or a C1-C5 alkyl group, a is 1 to 2, b is 2 to 3, and a+b is 4.

The polar functional group may be any one or two or more of an amino group, an epoxy group, a carboxyl group, a hydroxyl group, an amide group, a thiol group, a ketone group, an ester group, and an aldehyde group, or a reactive group which reacts with them.

Hereinafter, each process of the method of manufacturing a separator according to the embodiment will be described. Since the description of each of the polar silane compound, the aqueous polymer binder, the inorganic particles, and the porous substrate is as described above, it will be omitted for convenience.

As a means for suppressing a condensation reaction as compared with a hydrolysis reaction, according to an embodiment, the process (a) may be performed in a weakly acidic atmosphere of more than pH 4 and pH 6 or less.

In the process of preparing a coating slurry (a), the method or the order of adding components forming the coating slurry is not particularly limited, but since inorganic particles such as boehmite are basic during stirring with water, a pH range may be maintained in a specific range for obtaining a hydrolytic condensate binder of a polar silane compound. In an embodiment, the coating slurry of (a) may be prepared by including the following processes (a1) to (a3):

(a1) preparing an acid aqueous solution including a polar silane compound represented by Chemical Formula 1 and an acid component;
(a2) stirring inorganic particles, an acid component, and water to prepare an inorganic slurry; and
(a3) stirring the inorganic slurry prepared, an acid aqueous solution, and an aqueous polymer binder to prepare a coating slurry.

In an embodiment, an acid aqueous solution including an acid component and the polar silane compound represented by Chemical Formula 1 is prepared by the process (a1), and an inorganic slurry including an acid component is prepared by the process (a2), respectively, thereby pre-adjusting pH, and thus, the following effect may be expected. Since the inorganic particles are basic during stirring with water, when the polar silane compound, the inorganic particles, and the acid component are simultaneously stirred, pH may change while the polar silane compound is hydrolyzed-condensed in a weakly acidic atmosphere. Due to the change in pH, a condensation-suppressed hydrolytic condensate of a polar silane compound having a low molecular weight to be desired may not be secured, and agglomeration between inorganic particles may occur, and thus, it is not preferred. According to the embodiment, by pre-adjusting the pH of the inorganic slurry and the pH of the acid aqueous solution including the polar silane compound, a rapid pH change during stirring of the inorganic slurry and the acid aqueous solution in the process (a3) is prevented and the pH may be maintained constant while the polar silane compound is hydrolyzed-condensed. Thus, excellent heat resistance may be imparted even to a battery having an electrolyte solution inside.

As an embodiment, an absolute value of a difference in pH between the inorganic slurry prepared in the process (a2) and the acid aqueous solution prepared in the process (a1) may be 1 or less. In view of the above description, as an embodiment, the absolute value of a difference in pH may be 0.7 or less, 0.6 or less, 0.5 or less, 0.4 or less, 0.3 or less, 0.2 or less, or 0.1 or less, and as a more preferred embodiment, the absolute value of a difference in pH may be 0.

As an embodiment, the process of preparing an acid aqueous solution (a1) may be performed in a weakly acidic atmosphere of more than pH 4 and pH 6 or less. When the hydrolysis-condensation reaction is performed at pH 4 or less or more than pH 6, or using an inorganic acid such as sulfuric acid or hydrochloric acid, the low-molecular weight hydrolytic condensate of a polar silane compound to be desired may not be secured, and this may cause a problem of decreasing heat resistance of the separator or adhesive strength of the inorganic particle layer, and thus, it is not preferred. In view of the above, the weakly acidic atmosphere in the process (a1) may be more than pH 4 and pH 6 or less.

As an embodiment, in the process (a1), the polar silane compound may be included at 10 wt % or less with respect to the total weight of the acid aqueous solution. When the content of the polar silane compound in the acid aqueous solution is excessively high, self condensation may occur, and thus, the content for securing the low-molecular weight hydrolytic condensate of a polar silane compound may be adjusted. In view of the above, the content of the polar silane compound included in the acid aqueous solution may be more than 7 wt % or less, 5 wt % or less, 3 wt % or less and more than 0 wt %, or between the numerical values. In an embodiment, the content of the polar silane compound may be more than 0 wt % and 10 wt % or less, more than 0 wt % and 7 wt % or less, or more than 0 wt % and 5 wt % or less.

In an embodiment, the process of preparing an inorganic slurry (a2) may have the absolute value of a difference in pH of the acid aqueous solution prepared in the process (a1) of 1 or less, but in order to satisfy the hydrolyzed and condensation-suppressed conditions to be desired, the following pH conditions may be preferred for the pH in the subsequent process of preparing a coating slurry (a3). As an embodiment, the process of preparing an inorganic slurry (a2) may be performed in a weakly acidic atmosphere of more than pH 4 and pH 6 or less, or more than pH 4 and pH 5 or less. According to the embodiment, by preparing the inorganic slurry in the pH range, the conditions to be desired in which the polar silane compound is hydrolyzed and condensation-suppressed in the process of preparing a coating slurry (a3) may be better provided.

In an embodiment, the inorganic slurry prepared in (a2) may have a uniform acidity in order to prevent a rapid change in pH during stirring with an acid aqueous solution prepared in the process (a2) in the subsequent process of preparing a coating slurry (a3).

In an embodiment, the process of preparing a coating slurry (a3) may be performed in a weakly acidic atmosphere of more than pH 4 and pH 6 or less. When the hydrolysis-condensation reaction is performed at pH 4 or less or more than pH 6, or using an inorganic acid such as sulfuric acid or hydrochloric acid, the dispersibility of the prepared coating slurry is poor, agglomeration between inorganic particles occurs to increase an average particle diameter, the low-molecular weight hydrolytic condensate of a polar silane compound to be desired may not be secured, and this may cause a problem of decreasing thermal stability of the separator or adhesive strength of the inorganic particle layer, and thus, it is not preferred. In view of the above, in an embodiment, the weakly acidic atmosphere may be more than pH 4 and pH 5 or less.

The acid aqueous solution prepared in (a1), the inorganic slurry prepared in (a2), and the coating slurry prepared in (a3) may further include other components or additives commonly used in the art, and their compositions are not particularly limited.

In particular, according to an embodiment of the present disclosure, the pH of the acid aqueous solution and the inorganic slurry are pre-adjusted before stirring, and the acid aqueous solution and the inorganic slurry of which the pH has been pre-adjusted are stirred to prepare a coating slurry, thereby preventing pH from rapidly changing and maintaining and controlling the weakly acidic atmosphere so that the condensation reaction is more suppressed than the hydrolysis reaction. Accordingly, the content of the hydrolytic condensate of a polar silane compound may be increased, thereby securing excellent thermal stability.

In an embodiment, in the process (a), the polar silane compound may be included at 5 wt % or less with respect to the total weight of the coating slurry. The polar silane compound may be included in a certain amount or more for lowering the heat shrinkage rate at a high temperature of the separator and improving the adhesion/cohesion of the inorganic particle layer. However, when the content of the silane compound in the coating slurry is excessively high, the particle size of the slurry may change over time, and when the particle size of the slurry changes over time, the physical properties of the inorganic particle layer may locally change to cause non-uniformity of the overall physical properties of the separator, and thus, it is not preferred. In view of the above, in an embodiment, the content of the polar silane compound may be 5 wt % or less, 4.5 wt % or less, 4 wt % or less and more than 0 wt %, 1 wt % or more, 2 wt % or more, or between the numerical values with respect to the total weight of the coating slurry. In an embodiment, the content of the polar silane compound may be more than 0 wt % and 5 wt % or less or more than 0 wt % and 4 wt % or less.

In an embodiment, the acid component may be carbon dioxide; or an organic acid including one or two selected from acetic acid and lactic acid. When carbon dioxide is added to the coating slurry, the inorganic slurry, or the acid aqueous solution and then stirring or bubbling is performed, the carbon dioxide may become carbonic acid. When the acid component is used, the effect of the present disclosure may be achieved better and the condensation reaction may be easily suppressed in the pH range, and thus, it is more preferred, but is not limited thereto as long as the separator having the physical properties of the present disclosure is provided.

Since any common method known in the art may be applied without limitation to the process of preparing a coating slurry (a), it is not particularly limited herein. In an embodiment, it may be prepared by stirring at 0 to 60° C. for 1 hour to 5 days, and the agglomerated inorganic particles may be dispersed using a ball mill.

According to an embodiment of the present disclosure, the inorganic particle layer may be provided on at least one surface of the porous substrate by the process (b). In an embodiment, as a method of applying the coating slurry, all common methods known in the art may be applied, and though drying for forming the inorganic particle layer is not particularly limited, drying may be performed at 100° C. or lower or 30 to 60° C.

In an embodiment, when the polar functional group is introduced to the surface of the porous substrate, a hydrogen bond, a chemical bond, or polar attraction may act between the polar functional group provided on the surface of the porous substrate and the hydrolytic condensate binder of a polar silane compound or the aqueous polymer binder, thereby further improving adhesive strength between the porous substrate and the inorganic particle layer and further lowering a shrinkage rate at a high temperature to improve thermal stability. The method of introducing a polar functional group to the surface of the porous substrate may include, for example, a hydrophilic surface treatment, and the hydrophilic surface treatment may be performed by including, according to an example, one or more of a corona discharge treatment and a plasma discharge treatment under an atmosphere, oxygen, and an ozone atmosphere. The polar functional group introduced to the surface of the porous substrate may include a carboxyl group, an aldehyde group, a hydroxyl group, and the like, but is not particularly limited thereto.

In an embodiment, after the process (b), a process of aging the porous substrate having the inorganic particle layer formed thereon may be further included. Specifically, the aging may be performed at 50 to 150° C., and 65 to 120° C., the aging time may be 2 hours to 24 hours, 10 to 20 hours, and the aging may be performed for 20 hours. In an embodiment, the drying may be performed in a temperature range of 70 to 120° C. for 10 to 15 hours. adhesive strength between the porous substrate and the inorganic particle layer may be further increased and the heat shrinkage rate at a high temperature may be further lowered by the aging. That is, the method for manufacturing a separator according to a preferred embodiment of the present disclosure further includes the aging process (c), thereby providing a separator having more improved thermal stability and adhesive strength by a stable and strong chemical bond between the porous substrate and the inorganic particle layer.

According to an embodiment of the present disclosure, an electrochemical device including the separator according to an embodiment of the embodiments described above may be provided, and the electrochemical device may be any known energy storage device, and is not particularly limited, but as a non-limiting example, may be a lithium secondary battery. Since the lithium secondary battery is well known and its configuration is also known, it will not be described in detail in the present disclosure.

The lithium secondary battery according to an embodiment of the present disclosure may include the separator described above between a positive electrode and a negative electrode. Herein, the positive electrode and the negative electrode may be used without limitation as long as they are commonly used in the lithium secondary battery.

Hereinafter, the present disclosure will be described in more detail with reference to the examples and the comparative examples. However, the following examples and comparative examples are only an example for describing the present disclosure in more detail, and do not limit the present disclosure in any way.

First, the method of measuring the physical properties of the separator will be described.

Amount of Change in Peel Strength

An amount of change in peel strength ($\Delta P$) is calculated as follows:

$$\Delta P = P_1/P_2$$

In a separator including: a porous substrate, and an inorganic particle layer provided on at least one surface of the porous substrate, $P_1$, which is peel strength of the separator according to an embodiment of the present disclosure, is peel strength (gf/15 mm) of the separator when the inorganic particle layer includes inorganic particles, a hydrolytic condensate of a polar silane compound, and an aqueous polymer binder.

$P_2$ is peel strength of the separator when the inorganic particle layer includes inorganic particles and the hydrolytic condensate binder of a polar silane compound, without the aqueous polymer binder, and peel strength (gf/15 mm) of the separator including the porous substrate and the inorganic particle layer including boehmite particles and the hydrolytic condensate of (3-aminopropyl)triethoxysilane, provided at least one surface of the porous substrate. According to an embodiment, $P_2$ may be the peel strength of the separator of the reference example described later.

The peel strength ($P_1$, $P_2$) was measured based on ASTM D 3330, by the following method: a 3M double-sided tape (model: 665) having a width of 15 mm and a length of 60 mm was adhered from one end in a length direction on a copper plate having a thickness of 200 µm, a width of 15 mm, and a length of 100 mm, and the separator was adhered thereon by stacking and pressing so that the tape faces the inorganic particle layer of the separator, and UTM equipment available from Instron was used to perform a 180° peel test under conditions of a speed of 300 ram/min and a displacement of 100 mm.

Heat Shrinkage Rate

The heat shrinkage rate of the separator was measured based on ASTM D 1204, by the following method: Grid points were marked at 2 cm intervals on a square having sides of on a separator. One side of the square was the transverse direction (TD) and the other side of the square was the machine direction (MD). A specimen was placed in the center, 5 sheets of paper were placed each on and under the specimen, and the four sides of the paper were wrapped with tape. The specimen wrapped in paper was allowed to stand in a hot air drying oven at 130° C. for 60 minutes. Thereafter, the specimen was taken out and the separator was observed with a camera, thereby calculating the shrinkage rate in the length direction of the following Equation 1 and the shrinkage rate in the width direction of the following Equation 2:

Shrinkage rate in the length direction (%)=(length in the length direction before heating−length in the length direction after heating)×100/length in the length direction before heating        Equation 1

Shrinkage rate in the width direction (%)=(length in the width direction before heating−length in the width direction after heating)×100/length in the width direction before heating        Equation 2

TMA Melt Fracture Temperature

Two types of specimens of the separator with a width of 5 mm and a length of 10 mm were prepared, with one specimen having a length direction in the machine direction and the other specimen having a length direction in a transverse direction. The specimens each having a thickness of 5 to 50 µm, a width of 5 mm, and a length of 10 mm in each of MD and TD serving as length directions were prepared as noted above, and each specimen is mounted on a chamber of a thermomechanical analyzer (TMA) (model: SDTA840 (Mettler Toledo)) by hooking both ends of each specimen to a metal jig and pulled downward with a force of 0.008 N while heating at 5° C. per minute, the temperature at which the specimen was broken in each of MD and TD was recorded.

Impregnability of Electrolyte Solution

10 µl of an electrolyte solution in which 1 M lithium hexafluorophosphate (LiPF$_6$) was dissolved in a solution including ethylene carbonate (EC), ethyl methyl carbonate (EMC), and dimethyl carbonate (DMC) at a volume ratio of 30:50:20 was dropped on each of the separators of the examples and the comparative examples as one drop from a height of 50 mm with a micropipette, the separator was allowed to stand for 1 minute, and a long diameter of the spread mark of the electrolyte solution was measured and evaluated. The long diameter refers to the longest length across the electrolyte mark.

Amount of Change in Air Permeability

An amount of change in air permeability (ΔG) was calculated as follows:

$$\Delta G = G_1 - G_2$$

wherein $G_1$ is a Gurley permeability of the separator including the inorganic particle layer prepared above, $G_2$ is a Gurley permeability of the porous substrate itself, the permeability is measured in accordance with ASTM D 726, and the unit of the Gurley unit is sec/100 cc.

The Gurley permeability was measured according to the standard of ASTM D 726, using Densometer available from Toyoseiki. A time it took for 100 cc of air to pass a separator having an area of 1 in$^2$ was recorded in seconds.

Battery Resistance

A battery was manufactured under the following conditions, and battery resistance was measured.

Manufacture of Battery 94 wt % of LiCoO$_2$, 2.5 wt % of polyvinylidene fluoride as a fusion adhesive, and 3.5 wt % of carbon black as a conductive agent, based on the total weight of the positive electrode active material, were added to N-methyl-2-pyrrolidone (NMP) as a solvent, and stirring was performed to prepare a uniform positive electrode slurry. The slurry prepared above was coated on an aluminum foil having a thickness of 30 µm, dried, and pressed to manufacture a positive electrode having a total thickness of 150 µm. 95 wt % of artificial graphite, 3 wt % of acryl-based latex having Tg of −52° C. as a fusion adhesive, and 2 wt % of carboxymethyl cellulose (CMC) as a thickener, based on the total weight of the negative electrode active material, were added to water as a solvent, and stirring was performed to prepare a uniform negative electrode slurry. The slurry prepared above was coated on a copper foil having a thickness of 20 µm, dried, and pressed to manufacture a negative electrode having a total thickness of 150 µm. The positive electrode and the negative electrode manufactured above, and the separator of the examples and the comparative examples were assembled into a pouch type battery so that the separator was stacked between the positive electrode and the negative electrode, and the assembled battery was heat-fused at 80° C. and 1 MPa with a heat press machine so that the positive electrode, the negative electrode, and the separator were fused to each other. Thereafter, an electrolyte solution in which 1 M lithium hexafluorophosphate (LiPF$_6$) was dissolved was injected into a solution including ethylene carbonate (EC), ethyl methyl carbonate (EMC), and dimethyl carbonate (DMC) at a volume ratio of 30:50:20, and sealed to manufacture a secondary battery having a capacity of 2 Ah, and then discharge resistance was measured by a J-pulse method.

EXAMPLES

Reference Example

Preparation of Coating Slurry 1.65 parts by weight of lactic acid and 1.23 parts by weight of (3-aminopropyl)triethoxysilane (APTES) as a polar silane compound were added to 100 parts by weight of distilled water to prepare an acid aqueous solution at pH 4.5.

0.5 parts by weight of lactic acid and 67 parts by weight of boehmite having an average particle diameter (D50) of 0.3 µm were added to 100 parts by weight of distilled water, and stirring was vigorously performed for 6 hours to prepare an inorganic slurry at pH 4.5.

The acid aqueous solution and the inorganic slurry prepared above were stirred at a weight ratio of 2:1 to prepare a coating slurry at more than pH 4 and pH 5 or less.

Pretreatment of Porous Substrate

Both surfaces of a polyethylene porous film (porosity: 48%, Gurley permeability: 72 sec/100 cc, tensile strength MD 2105 kgf/cm$^2$, TD 1885 kgf/cm$^2$) having a thickness of 9 μm as a porous substrate film were corona discharge-treated (power density: 2 W/mm) to introduce a surface polar group, and the corona surface treatment was performed at a speed of 3 to 20 mpm (meter per minute).

Manufacture of Separator

The coating slurry was applied on both surfaces of the pretreated porous substrate and dried to form inorganic particle layers having a thickness of 1.5 μm on both surfaces, respectively. The porous substrate having the inorganic particle layer provided thereon was aged at 100° C. for 12 hours to manufacture a separator.

Example 1

A separator was manufactured in the same manner as in Reference Example, except that 0.15 parts by weight of polyvinylpyrrolidone as the aqueous polymer binder was further added to 100 parts by weight of the prepared coating slurry. At this time, a weight ratio $B_2/B_1$ of the weight of the aqueous polymer binder $B_2$ to the weight of the hydrolytic condensate binder of the polar silane compound in the inorganic particle layer of the separator was 0.12.

Example 2

A separator was manufactured in the same manner as in Reference Example, except that 0.3 parts by weight of polyvinylpyrrolidone as the aqueous polymer binder was further added to 100 parts by weight of the prepared coating slurry. At this time, a weight ratio $B_2/B_1$ of the weight of the aqueous polymer binder $B_2$ to the weight of the hydrolytic condensate binder of the polar silane compound in the inorganic particle layer of the separator was 0.24.

Example 3

A separator was manufactured in the same manner as in Reference Example, except that 0.3 parts by weight of polyvinylpyrrolidone as the aqueous polymer binder was further added to 100 parts by weight of the prepared coating slurry. At this time, a weight ratio $B_2/B_1$ of the weight of the aqueous polymer binder $B_2$ to the weight of the hydrolytic condensate binder of the polar silane compound in the inorganic particle layer of the separator was 0.48.

Comparative Example 1

A separator was manufactured in the same manner as in Example 3, except that in the preparation of a coating slurry, parts by weight of polyvinyl alcohol (PVA) having a melting temperature of 220° C. and a saponification degree of 99% and 2.75 parts by weight of acryl latex (ZEON, BM900B, solid content: 20 wt %) having Tg of −52° C. were mixed in 100 parts by weight of distilled water, and 25 parts by weight of boehmite having an average particle diameter (D50) of μm was added as inorganic particles to prepare a slurry, thereby forming inorganic particle layers having a thickness of 1.5 μm, respectively on both surfaces of the porous substrate.

Comparative Example 2

A separator was manufactured in the same manner as in Comparative Example 1, except that inorganic particle layers having a thickness of 5 μm were formed, respectively, on both surfaces of the porous substrate.

Comparative Example 3

It was intended to manufacture a separator in the same manner as in Example 2, except that 0.3 parts by weight of a non-aqueous polymer binder styrene-butadiene rubber (SBR) was further added instead of the aqueous polymer binder polyvinylpyrrolidone (PVP) to 100 parts by weight of the prepared coating slurry, but slurry agglomerated by the addition of SBR as the non-aqueous polymer binder, so that it was difficult to proceed with slurry coating, and thus, the inorganic particle layer was not able to be formed on the porous substrate. Accordingly, the separator of Comparative Example 3 was determined to be defective, and the physical properties were not separately evaluated.

Comparative Example 4

A separator was manufactured in the same manner as in Example 2, except that 0.3 parts by weight of a non-aqueous polymer binder N-vinylpyrrolidone monomer was further added instead of the aqueous polymer binder polyvinylpyrrolidone (PVP) to 100 parts by weight of the prepared coating slurry.

Comparative Example 5

A separator was manufactured in the same manner as in Example 2, except that in the manufacture of a coating slurry, instead of the polar silane compound APTES, the same content of 1.23 parts by weight of vinyltriethoxysilane (VIES) which is a non-polar silane compound was added to prepare an acid aqueous solution, but there were many spot defects on the surface due to dewetting of the inorganic particle layer. Accordingly, the separator of Comparative Example 5 was determined to be defective, and the physical properties were not separately evaluated.

Comparative Example 6

A separator was manufactured in the same manner as in Example 2, except that in the preparation of the acid aqueous solution, 6.84 parts by weight of lactic acid and 1.84 parts by weight of vinyltriethoxysilane (VIES) as a non-polar silane compound were added to 100 parts by weight distilled water, and then stirring was performed for 2 hours so that phase separation did not occur, thereby preparing an acid aqueous solution.

Comparative Example 7

A separator was manufactured in the same manner as in Example 1, except that hydrochloric acid was used in the preparation of the acid aqueous solution and the inorganic slurry to prepare a coating slurry maintained at pH 3.5.

Comparative Example 8

A separator was manufactured in the same manner as in Example 2, except that a coating slurry maintained at pH 8.2 was prepared without adding the acid component in the preparation of the acid aqueous solution and the inorganic slurry, but inorganic particles were agglomerated so that the inorganic particle layer was not formed well. Accordingly, the separator of Comparative Example 8 was determined to be defective, and the physical properties were not separately evaluated.

Evaluation Example: Evaluation of Separator

The results of evaluating the physical properties of the reference examples, the examples, and the comparative examples of the present disclosure are listed in the following Table 1.

TABLE 1

| | Amount of change in peel strength | Heat shrinkage rate (%) | | TMA melt fracture temperature (° C.) | | Electrolyte solution impregnability | Amount of change in air permeation | Battery resistance |
|---|---|---|---|---|---|---|---|---|
| | $\Delta P$ | MD | TD | MD | TD | (mm) | $\Delta G$ (sec/100 cm$^3$) | (m$\Omega$) |
| Reference Example | 1.00 | 1.9 | 1.6 | 295 | 215 | 31 | 14 | 22.40 |
| Example 1 | 1.13 | 1.8 | 1.7 | 274 | 230 | 36 | 18 | 22.86 |
| Example 2 | 1.47 | 1.9 | 2.1 | 228 | 242 | 32 | 20 | 22.64 |
| Example 3 | 1.62 | 1.5 | 1.1 | 262 | 212 | 34 | 38 | 24.27 |
| Comparative Example 1 | 1.49 | 50.5 | 47.4 | 159 | 150 | 20 | 47 | 26.83 |
| Comparative Example 2 | 1.75 | 16.4 | 14.6 | 173 | 181 | 23 | 50 | 36.68 |
| Comparative Example 3 | | | | Defective occurrence | | | | |
| Comparative Example 4 | 1.44 | 4.3 | 5.1 | 181 | 179 | 18 | 33 | 25.58 |
| Comparative Example 5 | | | | Defective occurrence | | | | |
| Comparative Example 6 | 1.03 | 5.2 | 5.3 | 278 | 243 | 24 | 34 | Immeasurable |
| Comparative Example 7 | 0.88 | 6.1 | 5.5 | 192 | 189 | 19 | 65 | 24.78 |
| Comparative Example 8 | | | | Defective occurrence | | | | |

In the above Table 1, the examples of the present disclosure had large amounts of change in peel strength as compared with the reference example, and thus, had further improved adhesion/cohesion of the inorganic particle layer, and also, had a low heat shrinkage rate at a high temperature of 130° C. and a high TMA melt fracture temperature to have significantly improved thermal stability. In addition, electrolyte solution impregnability was excellent, and the amount of change in air permeability was overall low. In addition, the secondary battery manufactured using the separators of the examples had lower battery resistance as compared with the battery using the separators of the comparative examples. In addition, referring to the results of Examples 1 to 3, it was confirmed that the peel strength tended to increase with the increased $B_2/B_1$ value.

Upon comparison of the separator of the reference example with the separator of the examples, it is shown that by using the aqueous polymer binder with the hydrolytic condensate of a polar silane compound as the binder of the inorganic particle layer, significantly excellent thermal stability may be secured and also peel strength may be significantly improved.

The amount of change in air permeability, $\Delta G$, of the separators of Examples 1 to 3 was 50 sec/100 cc or less, and thus, the amount of change in air permeability was relatively low, and the electrolyte solution impregnability was high. That is, the separator using both the hydrolytic condensate of a polar silane compound and the aqueous polymer binder according to an embodiment of the present disclosure as such is expected to be more advantageous for securing high output characteristics and life characteristic, when applied to an electrochemical device later.

In addition, in particular, when the separators of Examples 1 to 3 were pulled at a TMA melt fracture temperature measured by TMA while heating, they were melted at a temperature of 180° C. or higher and broken, and this shows that the heat shrinkage rate was significantly excellent, considering that the melting temperature of polyethylene used as the porous substrate of the separator was about 140° C. However, the separators of the comparative examples were melted and broken by heat at a temperature lower than 180° C., and it is shown that the thermal stability was poor as compared with the separators of the examples.

In Comparative Example 1 using a general organic polymer based binder, an inorganic particle layer having a thickness similar to the separators of the examples was formed, but the heat shrinkage rate was very high and a TAM melt fracture temperature was low as compared with the separators of the examples, and thus, thermal stability was significantly poor. In addition, it was confirmed in Comparative Example 2 in which the thickness of the inorganic particle layer was formed to be 3 times thicker that thermal stability was poor as compared with the separators of the examples, and Comparative Example 2 had very poor battery resistance characteristics as a result of forming the inorganic particle layer to be thick. It was confirmed from the above results that according to an embodiment of the present disclosure, though the separator was manufactured by providing a thin inorganic particle layer on the porous substrate, the thermal stability was significantly improved as compared with the separator having the inorganic particle layer provided on the porous substrate using a conventional organic polymer-based binder.

In Comparative Example 3 in which a non-aqueous polymer binder (SBR) was used rather than the aqueous polymer binder unlike the embodiment of the present disclosure, slurry agglomeration occurred so that it was difficult to proceed with slurry coating, and thus, the inorganic particle layer was not able to be formed on the porous substrate. In Comparative Example 4 using a non-aqueous polymer binder (N-vinylpyrrolidone monomer) which is a different type from that of Comparative Example 3, the inorganic particle layer was formed, but the adhesion/cohesion of the inorganic particle layer and the thermal stability were insignificantly improved. In addition, the electrolyte impregnability was poor as compared with the examples.

In Comparative Example 5 using a non-polar silane compound rather than the polar silane compound unlike the embodiment of the present disclosure, there were many spot defects on the surface due to the dewetting of the inorganic particle layer. In Comparative Example 6 in which stirring was performed for 2 hours so that phase separation of VIES did not occur, dewetting was improved a lot as compared with Comparative Example 5, but spot defects still remained, and thus, it was difficult to measure battery resistance and battery evaluation was not allowed.

In Comparative Examples 7 and 8, pH was excessively low or high, so that the low-molecular weight hydrolytic condensate of a polar silane compound was not able to be obtained, and thus, the adhesion/cohesion to be desired and also the thermal stability of the inorganic particle layer were not able to be achieved, or the separator was manufactured to be defective.

According to an embodiment, a secondary battery separator having an inorganic particle layer in which inorganic particles are connected to each other to form pores, provided on at least one surface of a porous substrate is provided, and a hydrolytic condensate binder of a polar silane compound which is prepared under specific conditions of hydrolyzing and simultaneously condensation-suppressing a silanol or alkoxysilane-based compound and an aqueous polymer binder may be used together as a binder of the inorganic particle layer to significantly improve the thermal stability of the separator.

In addition, simultaneously, according to the embodiment, it is considered that the condensation-suppressed hydrolytic condensate binder of a polar silane compound and the aqueous polymer binder are applied together to the binder of the inorganic particle layer, thereby more strongly connecting and fixing inorganic particles in the inorganic particle layer by a hydrogen bond or other polar attraction, and by the effect, the heat shrinkage rate at a high temperature of the separator is lowered to significantly improve thermal stability and also adhesion/cohesion of the inorganic particle layer is improved to prevent release of inorganic particles during cell assembly and suppress defects due to the released inorganic particles, thereby significantly improving battery safety.

The separator according to an embodiment may secure significantly high thermal stability and simultaneously improve peel strength. The separator of an embodiment may have an amount of change in peel strength, $\Delta P$, represented by the following Equation (1) of 1.1 or more, 1.2 or more, 1.3 or more, or 1.5 or more:

$$\Delta P = P_1/P_2 \qquad (1)$$

wherein $P_1$ is peel strength of the separator, $P_2$ is peel strength of a separator including a porous substrate and an inorganic particle layer which is provided on at least one surface of the porous substrate and includes boehmite particles and a hydrolytic condensate of (3-aminopropyl) triethoxysilane, and the peel strength is measured by adhering a 3M double-sided tape (Model: 665) having a width of 15 mm and a length of 60 mm from one end in a length direction on a copper plate having a thickness of 200 µm, a width of 15 mm, and a length of 100 mm, adhering the separator thereon by stacking and pressing so that the tape faces the inorganic particle layer of the separator, and using UTM equipment available from Instron to perform a 180° peel test under conditions of a speed of 300 ram/min and a displacement of 100 mm.

An embodiment may provide a separator which has better thermal stability so that when the separator is manufactured into specimens each of which has a thickness of 5 to 50 µm, a width of 5 mm, and a length of 10 mm in which a length direction is MD and TD, and the specimen is placed in a chamber of TMA (thermomechanical analyzer, model: SDTA840 (Mettler Toledo)) by hooking both ends of the specimen to a metal jig and pulled downward with a force of 0.008 N while heating at 5° C. per minute, the specimen is broken at a temperature of 180° C. or higher, 190° C. or higher, 200° C. or higher, or 210° C. or higher.

In an embodiment, the separator may have a heat shrinkage rate in MD and TD measured after the separator is allowed to stand at 130° C. for 60 minutes of 3% or less or 2.5% or less.

According to an embodiment of the present disclosure, the hydrolytic condensate binder of a polar silane compound and an aqueous polymer binder may be used together to significantly improve electrolyte impregnability. In an embodiment, after 10 µl of an electrolyte solution in which 1 M lithium hexafluorophosphate (LiPF$_6$) is dissolved in a solution including ethylene carbonate (EC), ethyl methyl carbonate (EMC), and dimethyl carbonate (DMC) at a volume ratio of 30:50:20 is dropped on the separator as one drop from a height of 50 mm with a micropipette and then the separator is allowed to stand for 1 minute, an electrolyte solution spread mark may have a long diameter of 25 mm or more.

In addition, the separator according to an embodiment may have an improved air permeability so that an amount of change in air permeability is 50 sec/100 cc or less as compared with a porous substrate having no inorganic particle layer.

In addition, in an embodiment, when the porous substrate is modified to have a polar functional group such as a carboxyl group, an aldehyde group, and a hydroxyl group by a surface treatment including one or more of a corona discharge treatment and a plasma discharge treatment, hydrogen bonding or chemical bonding with a functional group on the surface of the porous substrate is allowed by the binder which fixes the surface of the inorganic particle layer, and thus, adhesive strength between the porous substrate and the inorganic particle layer is significantly excellent without using a conventional organic polymer-based binder and heat shrinkage rate at a high temperature is significantly lowered, so that thermal stability may be significantly improved.

In addition, in a preferred embodiment, after the inorganic particle layer is formed, an aging process is performed, thereby increasing an adhesive strength between the porous substrate and the inorganic particle layer and lowering a heat shrinkage rate at a high temperature.

In a most preferred embodiment, a new separator satisfying all of the physical properties may be provided.

Hereinabove, although the present disclosure has been described by specific matters, limited embodiments, and drawings, they have been provided only for assisting the entire understanding of the present disclosure, and the present disclosure is not limited to the embodiments, and various modifications and changes may be made by those skilled in the art to which the present disclosure pertains from the description.

Therefore, the spirit of the present disclosure should not be limited to the above-described embodiments, and the following claims as well as all modifications equal or equivalent to the claims are intended to fall within the scope and spirit of the disclosure.

What is claimed is:

1. A method of manufacturing a separator, the method comprising:
    (a) stirring a polar silane compound represented by the following Chemical Formula 1, inorganic particles, an acid component, an aqueous polymer binder, and water to prepare a coating slurry; and
    (b) applying the coating slurry prepared on at least one surface of a polyolefin-based porous substrate and drying the slurry to prepare an inorganic particle layer:

$$A_a Si(OR)_b \qquad \text{Chemical Formula 1}$$

wherein A is independently a polar functional group or a C1-C10 alkyl group having a polar functional group, R is independently hydrogen or a C1-C5 alkyl group, a is 1 to 2, b is 2 to 3, and a+b is 4,
    wherein the polar functional group includes any one or two or more of an amino group, an epoxy group, a carboxyl group, a hydroxyl group, an amide group, a thiol group, a ketone group, an ester group, and an aldehyde group, and
    wherein the polyolefin-based porous substrate is prepared by a hydrophilic surface treatment.

2. The method of manufacturing a separator of claim 1, wherein the coating slurry of (a) is prepared by including the following processes (a1) to (a3):
    (a1) preparing an acid aqueous solution including a polar silane compound represented by Chemical Formula 1 and an acid component;
    (a2) stirring inorganic particles, an acid component, and water to prepare an inorganic slurry; and
    (a3) stirring the inorganic slurry prepared above, an acid aqueous solution, and an aqueous polymer binder to prepare a coating slurry.

3. The method of manufacturing a separator of claim 2, wherein the preparing of a coating slurry (a3) is performed under a weakly acidic atmosphere of more than pH 4 and pH 6 or less.

4. The method of manufacturing a separator of claim 2, wherein an absolute value of a difference in pH between the inorganic slurry prepared in the process (a2) and the acid aqueous solution prepared in the process (a1) is 1 or less.

5. The method of manufacturing a separator of claim 2, wherein in the process (a1), the polar silane compound is included at 10 wt % or less with respect to the total weight of the acid aqueous solution.

6. The method of manufacturing a separator of claim 1, wherein in the process (a), the polar silane compound is included at 5 wt % or less with respect total weight of the coating slurry.

7. The method of manufacturing a separator of claim 1, wherein the process of preparing of a coating slurry (a) is performed under a weakly acidic atmosphere of more than pH 4 and pH 6 or less.

8. The method of manufacturing a separator of claim 1, wherein the acid component is carbon dioxide; or an organic acid including any one or two selected from acetic acid and lactic acid.

9. The method of manufacturing a separator of claim 1, further comprising: (c) aging the polyolefin-based porous substrate having the inorganic particle layer provided thereon, after the process (b).

10. The method of manufacturing a separator of claim 1, wherein the hydrophilic surface treatment is performed by including one or more of a corona discharge treatment and a plasma discharge treatment.

* * * * *